(12) United States Patent
Tucker

(10) Patent No.: US 7,461,080 B1
(45) Date of Patent: *Dec. 2, 2008

(54) SYSTEM LOGGING WITHIN OPERATING SYSTEM PARTITIONS USING LOG DEVICE NODES THAT ARE ACCESS POINTS TO A LOG DRIVER

(75) Inventor: Andrew G. Tucker, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 10/744,360

(22) Filed: Dec. 22, 2003

Related U.S. Application Data

(60) Provisional application No. 60/469,558, filed on May 9, 2003.

(51) Int. Cl.
*G06F 7/00* (2006.01)
(52) U.S. Cl. ............ 707/102; 707/200; 718/1; 718/100
(58) Field of Classification Search .......... 718/1, 718/100, 104; 719/310, 313, 314, 315, 319; 707/1, 100, 102, 200; 709/227
See application file for complete search history.

(56) References Cited

U.S. PATENT DOCUMENTS

| | | | |
|---|---|---|---|
| 5,155,809 A | * | 10/1992 | Baker et al. ............. 709/227 |
| 5,283,868 A | * | 2/1994 | Baker et al. ............. 709/227 |
| 5,291,597 A | * | 3/1994 | Shorter et al. ........... 718/100 |
| 5,325,517 A | * | 6/1994 | Baker et al. ............. 714/11 |
| 5,325,526 A | | 6/1994 | Cameron et al. |
| 5,437,032 A | | 7/1995 | Wolf et al. |
| 5,590,314 A | | 12/1996 | Ueno et al. |
| 5,784,706 A | | 7/1998 | Oberlin et al. |

(Continued)

FOREIGN PATENT DOCUMENTS

EP 389151 A2 9/1990

(Continued)

OTHER PUBLICATIONS

European Search Report from the European Patent Office for Foreign Patent Application No. 04252690.5 (3 pgs.).

(Continued)

*Primary Examiner*—Van H Nguyen
(74) *Attorney, Agent, or Firm*—Hickman Palermo Truong & Becker LLP; Christian A. Nicholes

(57) ABSTRACT

A mechanism is disclosed for logging system messages in an operating system environment that has been partitioned into a global zone and one or more non-global zones. Each of the zones is associated with a separate log device node. A separate syslogd process executes in association with each zone. Each zone is associated with a separate virtual file system that contains a separate log file. Application processes executing in association with a zone can send messages to the log device node for that zone. The syslogd process executing in association with a zone reads messages from that zone's log device and writes at least some of the messages into that zone's log file. Consequently, the system logging ability is maintained in all of the zones, while isolating the processes and data in each zone from the processes and data in each other non-global zone.

15 Claims, 9 Drawing Sheets

U.S. PATENT DOCUMENTS

| | | | |
|---|---|---|---|
| 5,841,869 | A | 11/1998 | Merkling et al. |
| 5,845,116 | A | 12/1998 | Saito et al. |
| 5,963,911 | A | 10/1999 | Walker et al. |
| 6,064,811 | A | 5/2000 | Spilo et al. |
| 6,074,427 | A | 6/2000 | Fought et al. |
| 6,075,938 | A | 6/2000 | Bugnion et al. |
| 6,279,046 | B1 | 8/2001 | Armstrong et al. |
| 6,289,462 | B1 | 9/2001 | McNabb et al. |
| 6,438,594 | B1 | 8/2002 | Bowman-Amuah |
| 6,557,168 | B1 | 4/2003 | Czajkowski |
| 6,633,963 | B1 | 10/2003 | Ellison et al. |
| 6,681,238 | B1 | 1/2004 | Brice et al. |
| 6,681,258 | B1 | 1/2004 | Ratcliff et al. |
| 6,701,460 | B1 | 3/2004 | Suwandi et al. |
| 6,725,457 | B1 | 4/2004 | Priem et al. |
| 6,738,832 | B2 * | 5/2004 | Burr et al. .................. 710/8 |
| 6,792,514 | B2 | 9/2004 | Kapoor et al. |
| 6,813,766 | B2 * | 11/2004 | Hay .......................... 718/1 |
| 6,859,926 | B1 | 2/2005 | Brenner et al. |
| 6,944,699 | B1 | 9/2005 | Bugnion et al. |
| 6,957,435 | B2 | 10/2005 | Armstrong et al. |
| 6,961,941 | B1 * | 11/2005 | Nelson et al. .............. 719/319 |
| 6,993,762 | B1 | 1/2006 | Pierre |
| 7,051,340 | B2 | 5/2006 | Fisher et al. |
| 7,076,634 | B2 | 7/2006 | Lambeth et al. |
| 7,095,738 | B1 | 8/2006 | Desanti |
| 7,096,469 | B1 | 8/2006 | Kubala et al. |
| 7,188,120 | B1 * | 3/2007 | Leonard et al. ............. 707/102 |
| 2002/0069369 | A1 * | 6/2002 | Tremain ..................... 713/201 |
| 2002/0083367 | A1 | 6/2002 | McBride et al. |
| 2002/0120660 | A1 | 8/2002 | Hay et al. |
| 2002/0156824 | A1 | 10/2002 | Armstrong et al. |
| 2002/0161817 | A1 | 10/2002 | Dorofeev et al. |
| 2002/0173984 | A1 | 11/2002 | Robertson et al. |
| 2002/0174215 | A1 | 11/2002 | Schaefer |
| 2003/0014466 | A1 | 1/2003 | Berger et al. |
| 2003/0069939 | A1 | 4/2003 | Russell |
| 2004/0010624 | A1 | 1/2004 | Garofalo et al. |
| 2004/0162914 | A1 | 8/2004 | St. Pierre et al. |
| 2004/0210760 | A1 | 10/2004 | McGrath et al. |
| 2004/0215848 | A1 | 10/2004 | Craddock et al. |

FOREIGN PATENT DOCUMENTS

| | | |
|---|---|---|
| EP | 1043658 A1 | 10/2000 |
| EP | 1 253 516 A2 | 10/2002 |
| EP | 1228038 A2 | 2/2003 |
| EP | 1300766 A | 4/2003 |
| WO | WO 00/45262 A2 | 8/2000 |

OTHER PUBLICATIONS

Claims As Filed in European Patent Application No. 04252690.5 (6 pgs.).
U.S. Appl. No. 10/833,474, filed Apr. 27, 2004.
U.S. Appl. No. 10/767,118, filed Jan. 28, 2004.
U.S. Appl. No. 10/767,117, filed Jan. 28, 2004.
U.S. Appl. No. 10/766,094, filed Jan. 27, 2004.
U.S. Appl. No. 10/763,147, filed Jan. 21, 2004.
U.S. Appl. No. 10/769,415, filed Jan. 30, 2004.
U.S. Appl. No. 10/761,622, filed Jan. 20, 2004.
U.S. Appl. No. 10/767,003, filed Jan. 28, 2004.
U.S. Appl. No. 10/762,067, filed Jan. 20, 2004.
U.S. Appl. No. 10/762,066, filed Jan. 20, 2004.
U.S. Appl. No. 10/767,235, filed Jan. 28, 2004.
U.S. Appl. No. 10/771,827, filed Feb. 3, 2004.
U.S. Appl. No. 10/771,698, filed Feb. 3, 2004.
U.S. Appl. No. 10/768,303, filed Jan. 29, 2004.
European Patent Office, "European Search Report," application No. 04252689.7, mailing date Jul. 28, 2005, 3 pages.
Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.
Official Action from EPO for foreign patent application No. 04 252 690.5—2211 dated Nov. 23, 2005 (5 pgs)—attached.
Current Claims in EPO patent application No. 04 252 690.5—2211 (9 pgs)—attached.
Poul-Henning Kamp, et al., "Jails: Confining the omnipotent root", 2nd Intl System Administration and Networking Conference Proceedings "SANE 2000", May 22-25, 2000, Maastricht, The Netherlands, pp. 1-11.
Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).
Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).
Network Working Group entitled "IP Version 6 Addressing Architecture", by R. hinden, Nokia, S. Deering, Cisco System, dtd Jul. 1998, (28 pgs).
IBM entitled Partitioning for the IBM eserver pSeries 690 System, © Copyright IBM Corp. 2001 (12 pgs).
IBM System Partitioning on IBM eserver xSeries Servers entitled "Effective Server Consolidation and Resources Management with System Partitioning" by Mark T. Chapman, IBM Server Group, dtd Dec. 2001, (23 pgs).
Virtual Private Servers and Security Contexts, dtd May 10, 2004, http://www.solucorp.qc.ca/miscprj/s_content.hc?prjstate=1 &nodoc=0, (2 pgs).
SunSoft, a Sun Microsystems, Inc. Business entitled "File System Administration", © 1994 Sun Microsystems, Inc., (62 pgs).
Official Action from EPO for foreign patent application No. 04 252 690.5—2211 dated Nov. 23, 2005 (5 pgs)—attached.
Mc Dougall, Richard, et al., "Resource Management", Prentice Hall, 1999, 25 pages.
Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.
Hope, Paco, "Using Jails in FreeBSD for Fun and Profit", ;Login: The Magazine of Usenix and Sage, vol. 27, No. 3, Jun. 2002, 9 pages.
Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html>Printed May 1, 2007, 18 pages.
Thompson, K., "UNIX Implementation", Bell Laboratories, The Bell System Technical Journal, 1978, pp. 1-9.
Czajkowski, G., "Application isolation in the Java Virtual Machine", 2000, ACM Press, Proceedings of the 15th ACM SIGPLAN Conference on Object-Oriented Programming, Systems, Languages, and Applications, pp. 354-366.
Czajkowski, G., "Multitasking without compromise: a virtual machine evolution", ACM Press, Proceedings of the 16th ACM SIGPLAN Conference on Object Oriented Programming, Systems, Languages, and Applications, dated Oct. 2001, pp. 125-138.
Osman, S., et al., "The design and implementation of Zap: a system for migrating computing environments", SIGOPS Operating System, Rev. 36, SI, dated Dec. 2000, pp. 361-376.
Presotto et al., "Interprocess Communication in the Ninth Edition Unix System", John Wiley & Sons, Ltd., dated Mar. 1990, 4 pages.
Stevens, "Advanced programming in the Unix Environment", Addison-Wesley, 1993, pp. 427-436.
Watson, "TrustedBSD—Adding Trusted Operating System Features to FreeBSD", The USENIX Association, 2001, 14 pages.
Noordende et al., "Secure and Portable Confinement of Untrusted Programs", ACM 2002, 14 pages.
Hope, "Using Jails in FreeBSD for fun and profit", ;Login: The Magazine of Usenix &Sage, vol. 27, No. 3, dated Jun. 2002, pp. 48-55.

* cited by examiner

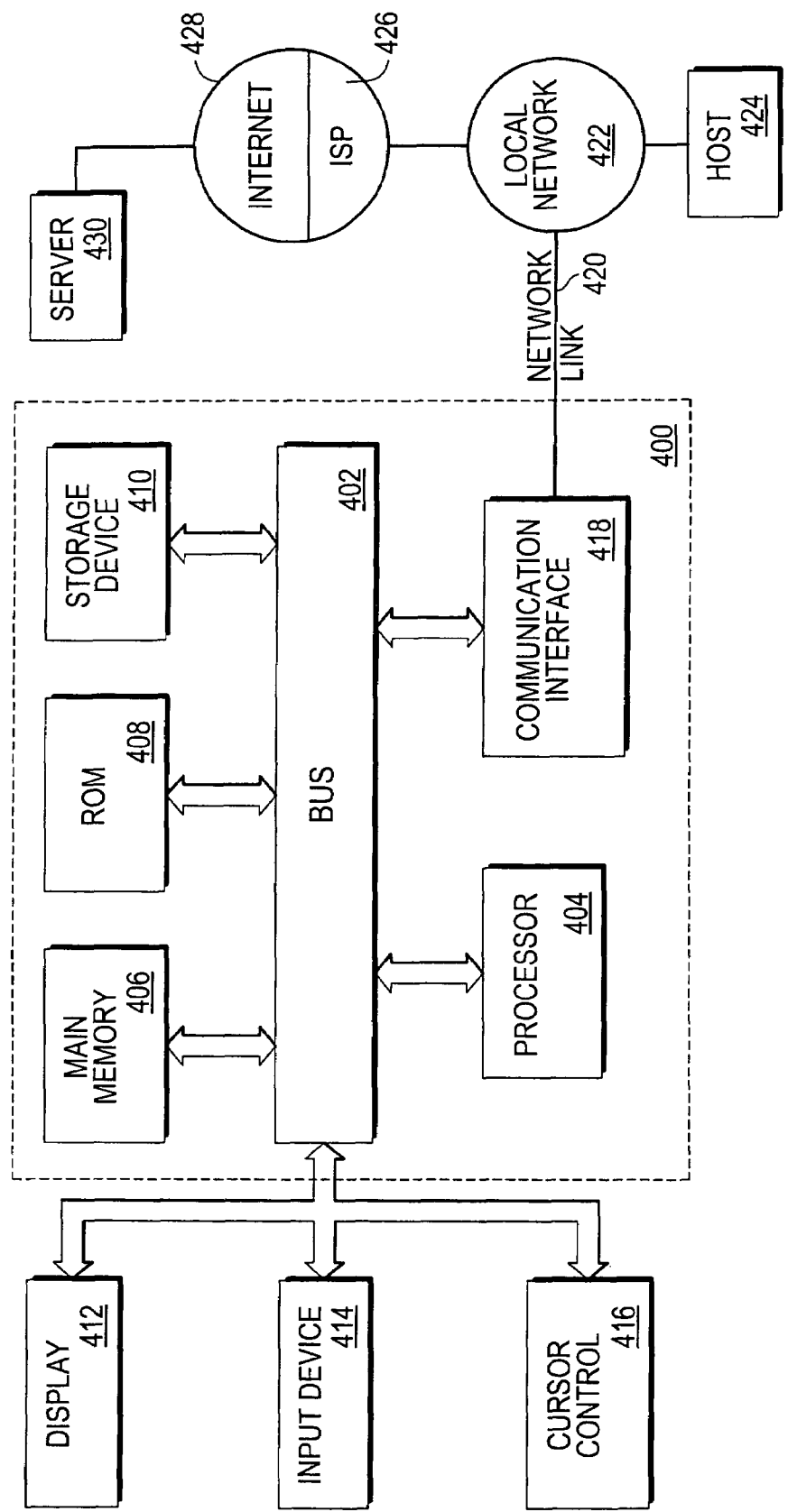

SYSTEM LOGGING WITHIN OPERATING SYSTEM PARTITIONS USING LOG DEVICE NODES THAT ARE ACCESS POINTS TO A LOG DRIVER

CLAIM OF PRIORITY

This application claims priority to U.S. Provisional Application Ser. No. 60/469,558, filed May 9, 2003, entitled "OPERATING SYSTEM VIRTUALIZATION," by Andrew G. Tucker, et al., the entire contents of which are incorporated by reference as if fully set forth herein.

BACKGROUND

Many of today's computing systems include computing resources that are not fully utilized. The owners of these systems often could benefit by increasing the utilization of these systems' computing resources.

A number of approaches could be adopted in order to increase utilization. Under a "consolidation" approach, the processes and data of multiple parties might be co-located on a single hardware unit in order to more fully utilize the resources of the hardware unit. Under the consolidation approach, multiple parties might share a single hardware unit's resources, including file systems, network connections, and memory structures. For example, multiple businesses might have separate websites that are hosted by the same server.

However, some of the parties might not know or trust each other. In some cases, some of the parties actually might be competitors with others of the parties. Under such circumstances, each party would want to ensure that its processes and data were shielded, or isolated, from access by other parties and those other parties' processes.

Mechanisms that would isolate one party's processes and data from other parties sharing the same hardware unit have been proposed. For example, a "jail" mechanism provides the ability to partition an operating system environment into a "non-jailed" environment and one or more "jailed" environments. The jail mechanism allows users, processes, and data to be associated with a jailed environment. For example, one group of users, processes, and data may be associated with one jailed environment, and another group of users, processes, and data may be associated with another jailed environment. The jail mechanism restricts users and processes that are associated with a particular jailed environment from accessing processes and data that are associated with environments (both jailed and non-jailed) other than the particular jailed environment.

Some operating system environments provide a system logging mechanism that permits processes to send, to a designated message stream, messages designated as "log messages." A designated process may read the log messages from the designated message stream and write the log messages to a log file. A user may view the log file in order to diagnose problems occurring within the operating system environment. Processes also may read the log messages from the designated message stream.

As discussed above, an operating system environment may be partitioned into a non-jailed environment and one or more jailed environments. When an operating system environment is so partitioned, the designated message stream, the designated process, and the log file remain associated with the non-jailed environment. As a result, when a process that is associated with a particular jailed environment sends a log message, the log message is sent to the designated message stream in the non-jailed environment. Unfortunately, other processes that are associated with the particular jailed environment are unable to read from the designated message stream, because the designated message stream is not associated with the particular jailed environment. Additionally, users that are associated with the particular jailed environment are unable to view the log file because the log file is not associated with the particular jailed environment.

SUMMARY

A mechanism is disclosed for logging system messages in an operating system environment that has been partitioned into a global zone and one or more non-global zones. Each of the zones is associated with a separate log device node. A separate syslogd process executes in association with each zone. Each zone is associated with a separate virtual file system that contains a separate log file. Application processes executing in association with a zone can send messages to the log device node for that zone. The syslogd process executing in association with a zone reads messages from that zone's log device node and writes at least some of the messages into that zone's log file. Consequently, the system logging ability is maintained in all of the zones, while the processes and data in each zone are isolated from the processes and data in each other non-global zone.

BRIEF DESCRIPTION OF THE DRAWINGS

FIG. 4 is a hardware block diagram of a sample computer system, upon which one or more components of an embodiment of the present invention may be implemented.

DETAILED DESCRIPTION OF EMBODIMENT(S)

System Overview

Figure 1:
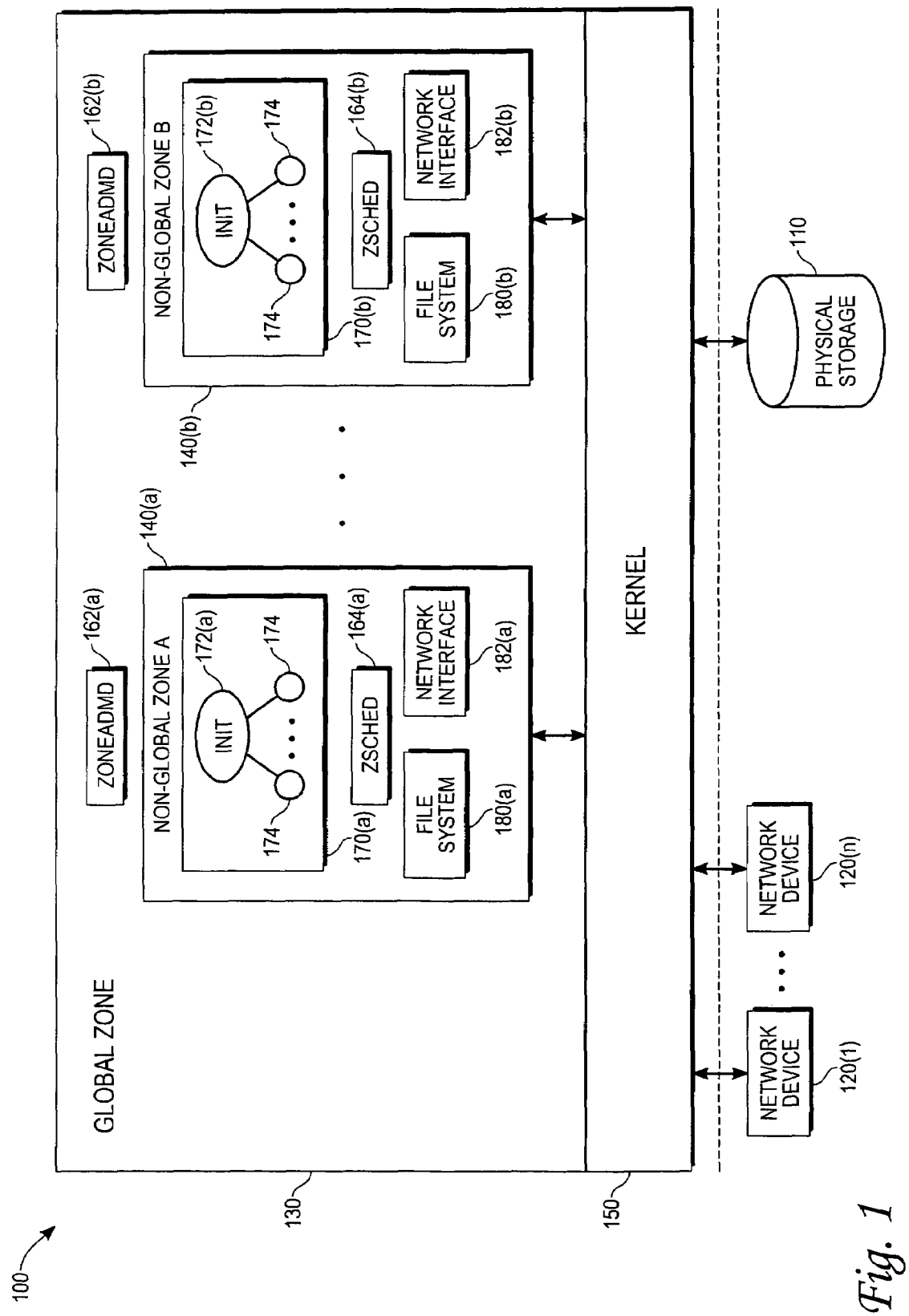
FIG. 1 is a functional block diagram of a representative operating system (OS) environment for a computing system in which one embodiment of the present invention may be implemented.

FIG. 1 illustrates a functional block diagram of an operating system (OS) environment 100 in accordance with one embodiment of the present invention. OS environment 100 may be derived by executing an OS in a general-purpose computer system, such as computer system 400 illustrated in FIG. 4, for example. For illustrative purposes, the OS is assumed to be Solaris™ manufactured by Sun Microsystems, Inc. of Santa Clara, Calif. However, the concepts taught herein may be applied to any OS, including but not limited to Unix, Linux, Microsoft Windows, MacOS, etc.

As shown in FIG. 1, OS environment 100 may comprise one or more zones, including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities/resources, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system of another zone, nor can they access or affect the network interface of another zone. As a result, the processes 170 in a non-global zone 140 are limited to accessing and affecting the processes and resources in that zone. Isolated in this manner, each non-global zone 140 behaves like a virtual standalone computer. Such behavior may be desirable in many applications. For example, if a single computer system running a single instance of an OS is to be used to host multiple competing websites, then the data and processes of one competing website should be isolated from the data and processes of another competing website, so that information will not be leaked between the competitors. Partitioning an OS environment 100 into non-global zones 140 and hosting the competing websites in separate non-global zones 140 is one possible way of achieving this isolation.

In one embodiment, each non-global zone 140 may be administered separately. More specifically, a zone administrator may be assigned to a particular non-global zone 140 and granted rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above website example, each competitor can administer his/her zone, and hence, his/her own website, but cannot change or affect the website of a competitor. In one embodiment, to prevent a non-global zone 140 from affecting other zones, the entities in a non-global zone 140 generally are not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and resources within a non-global zone 140.

In one embodiment, kernel 150 enforces the zone boundaries. More specifically, kernel 150 ensures that processes 170 in one non-global zone 140 are not able to access or affect processes, file systems, and network interfaces of another zone (non-global or global). In addition to enforcing the zone boundaries, kernel 150 also provides a number of other services. These services include but are not limited to mapping the network interfaces 182 of the non-global zones 140 to the physical network devices 120 of the computer system, and mapping the file systems 180 of the non-global zones 140 to an overall file system and a physical storage 110 of the computer system.

Non-Global Zone States

In one embodiment, a non-global zone 140 may take on one of four persistent states: (1) Configured; (2) Installed; (3) Ready; and (4) Running. When a non-global zone 140 is in the Configured state, it means that an administrator in the global zone 130 has invoked certain services of the kernel 150 to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone, specification of one or more file systems to be mounted when the zone is created, specification of zero or more network interfaces, specification of devices to be configured when the zone is created, and zero or more resource controls to be imposed on the zone.

Once a zone is in the Configured state, a global administrator may invoke a service of the kernel 150 to put the zone into the Installed state. In doing so, the kernel 150 installs all of the necessary files into the zone's root directory.

To put an Installed zone into the Ready state, a global administrator invokes another service of kernel 150, which causes the kernel 150 to start a zoneadmd process 162 (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to create the non-global zone 140. In creating a non-global zone 140, a number of operations are performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a persistent virtual platform on which one or more processes may be executed. This virtual platform provides the resources necessary for enabling one or more processes to be executed within the non-global zone 140 in isolation from processes in other non-global zones 140. The virtual platform also makes it possible to isolate other entities/resources such as file system 180 and network interfaces 182 within the non-global zone 140, so that the zone behaves like a virtual standalone computer. When a non-global zone 140 is in the Ready state, no user or non-kernel processes are executing inside the zone. Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Partitioned System Logging Mechanism

Figure 2:
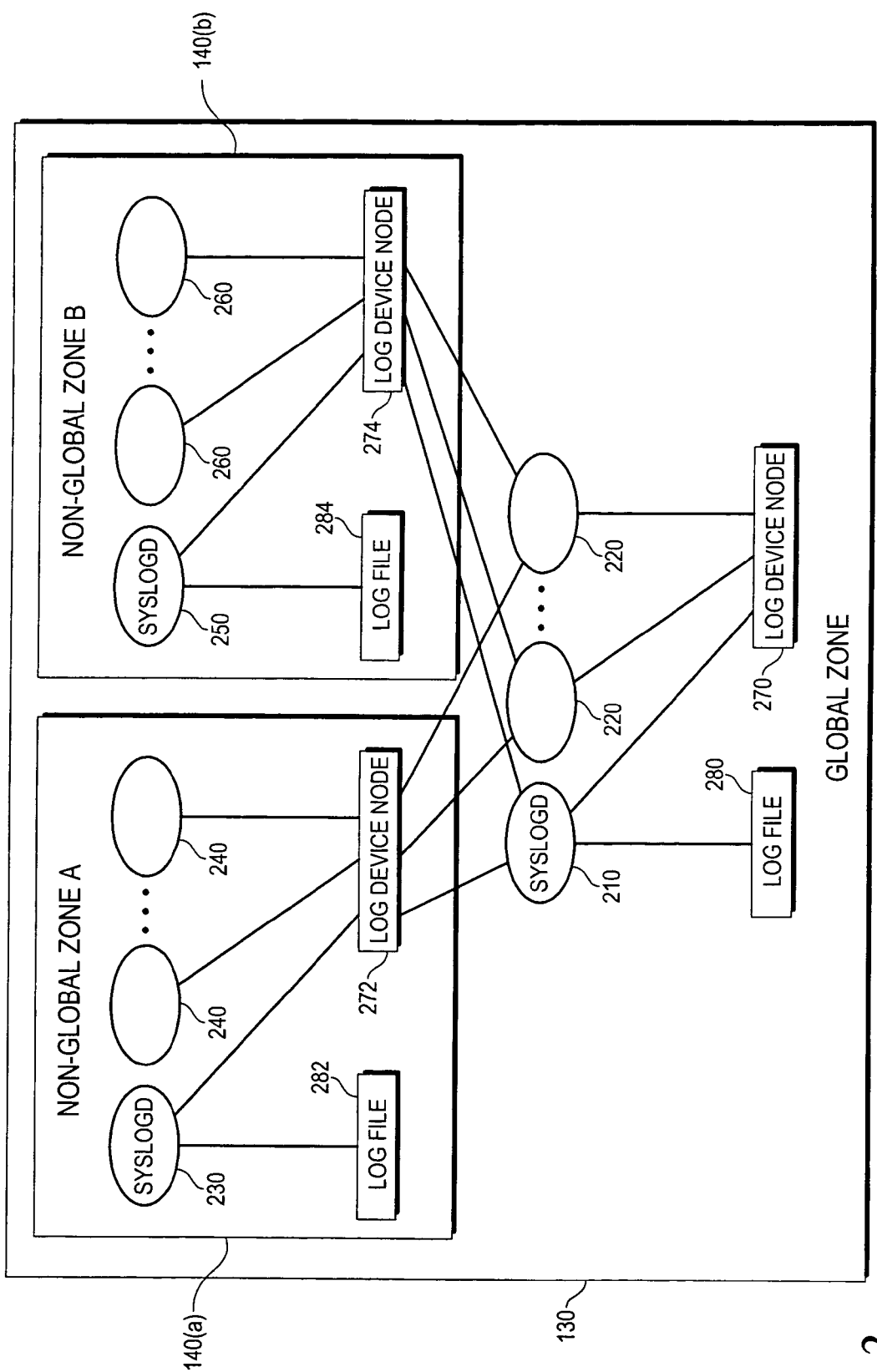
FIG. 2 illustrates a functional block diagram of a partitioned system logging mechanism in a partitioned OS environment in accordance with one embodiment of the present invention.
Figure 3A:
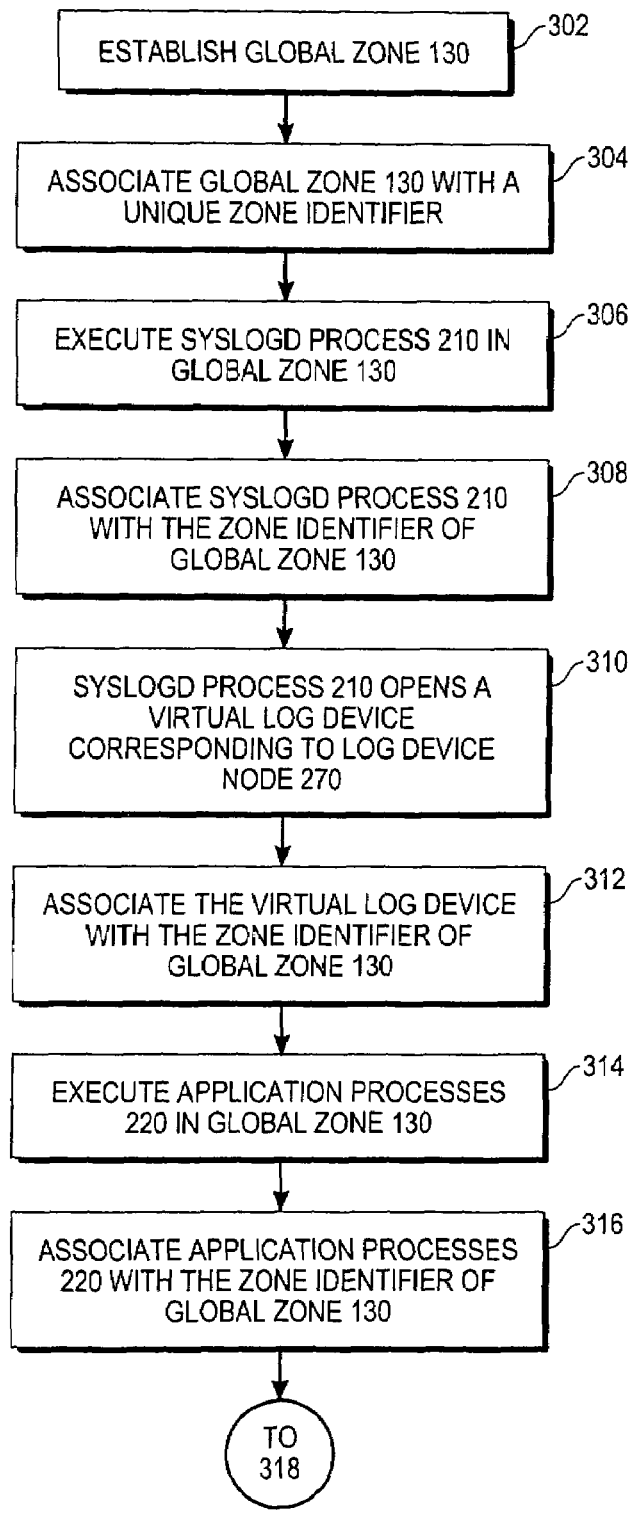
FIGS. 3A-F depict an operational flow for logging system messages in an OS environment that has been partitioned into a global zone and one or more non-global zones, in accordance with one embodiment of the present invention.
Figure 3B:
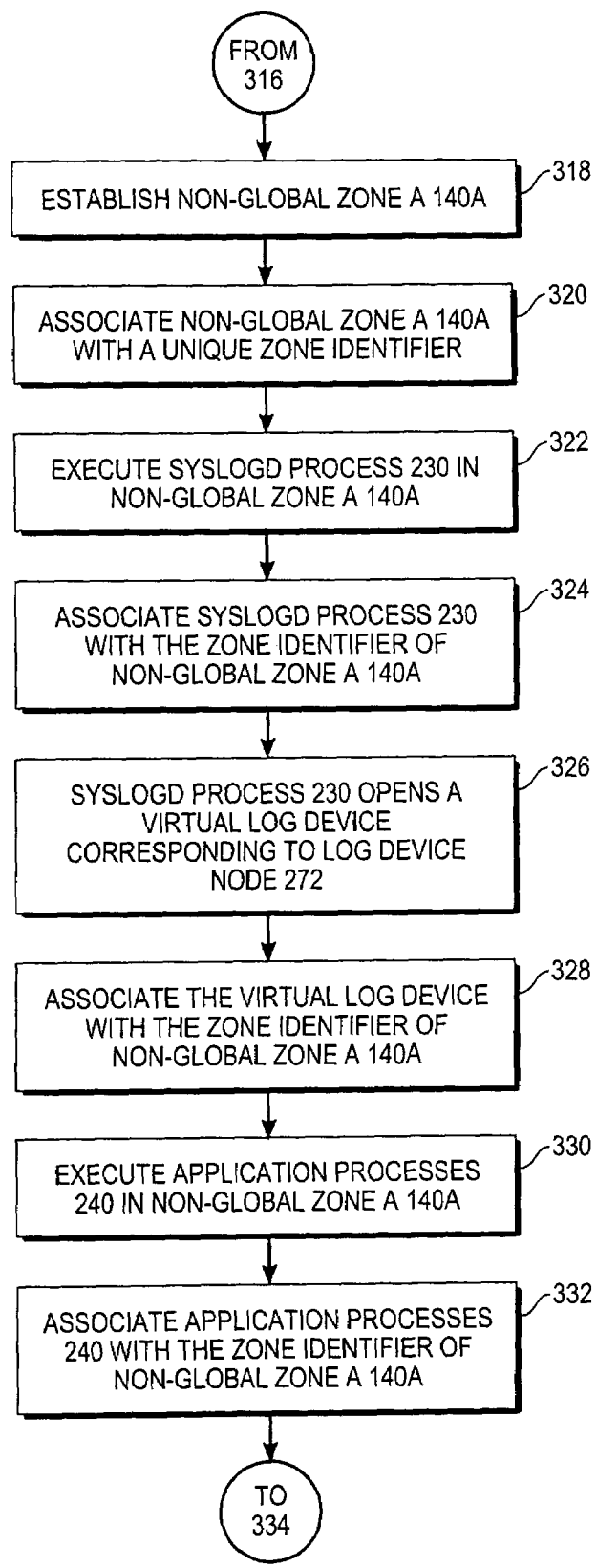
Figure 3C:
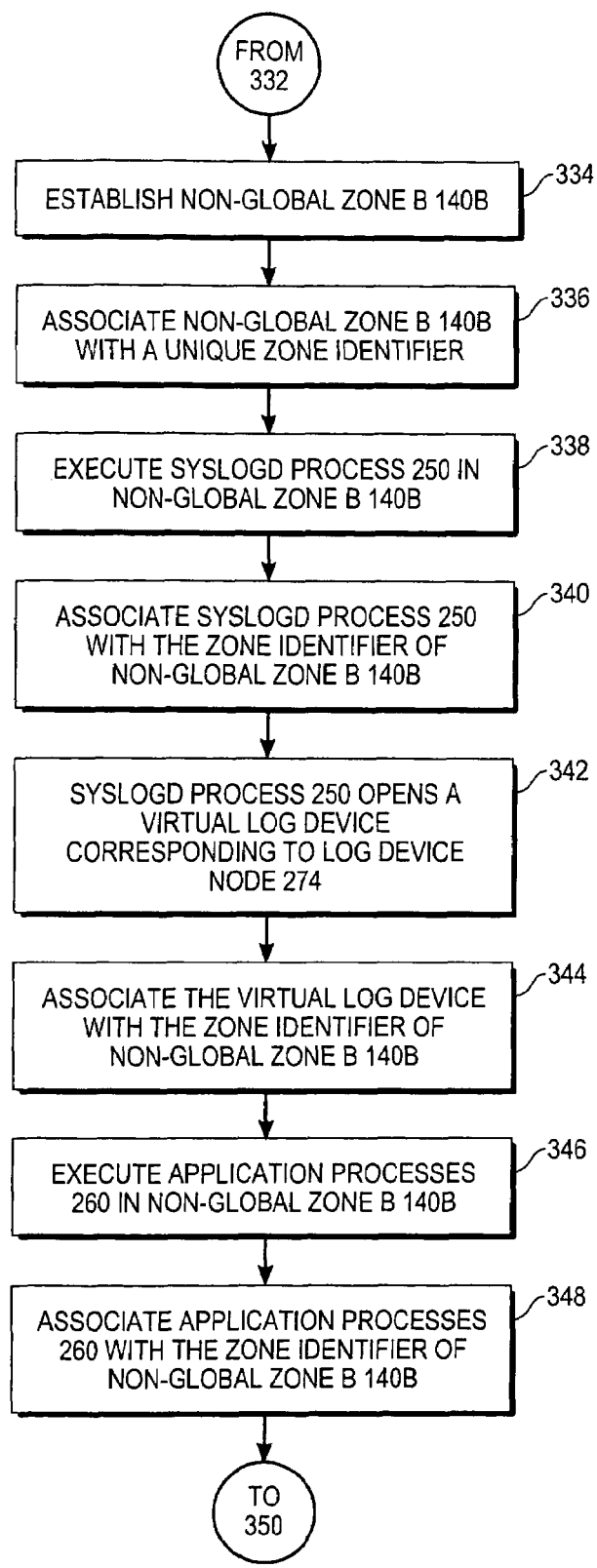
Figure 3D:
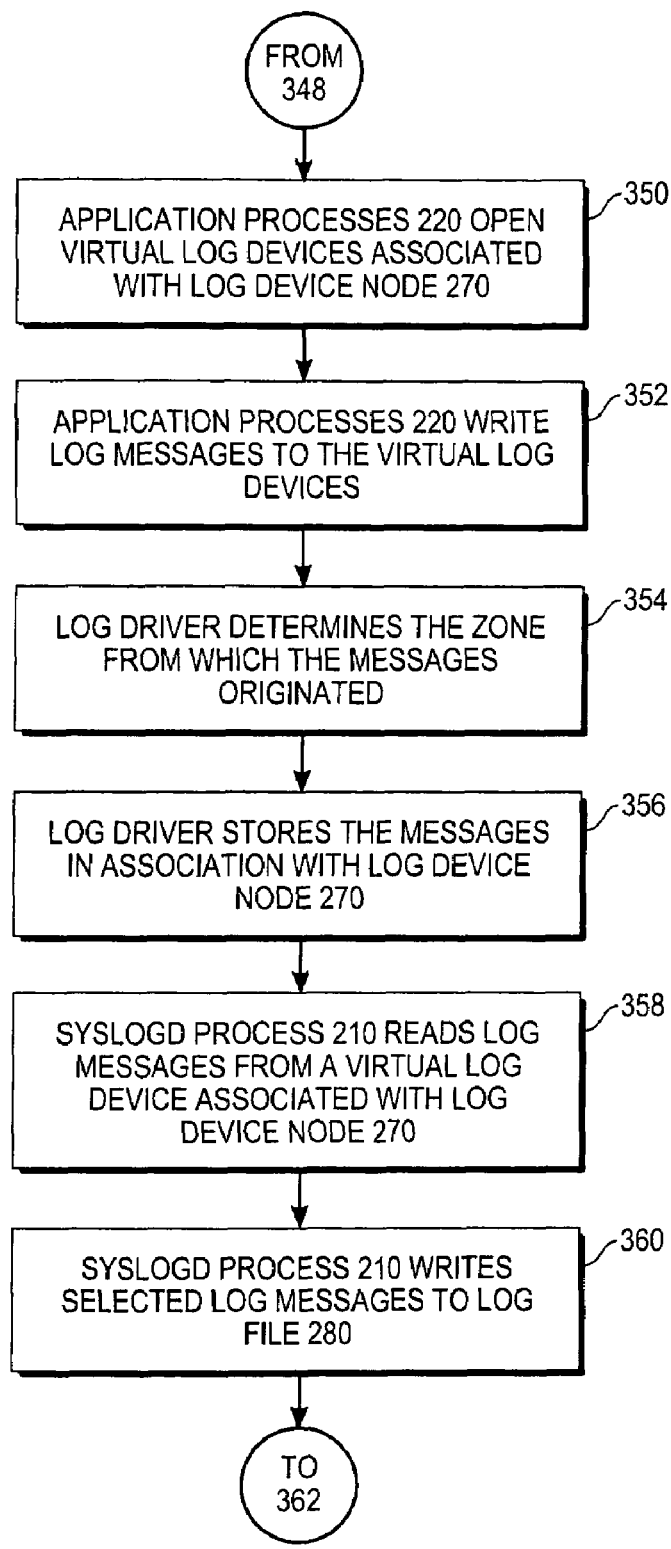
Figure 3E:
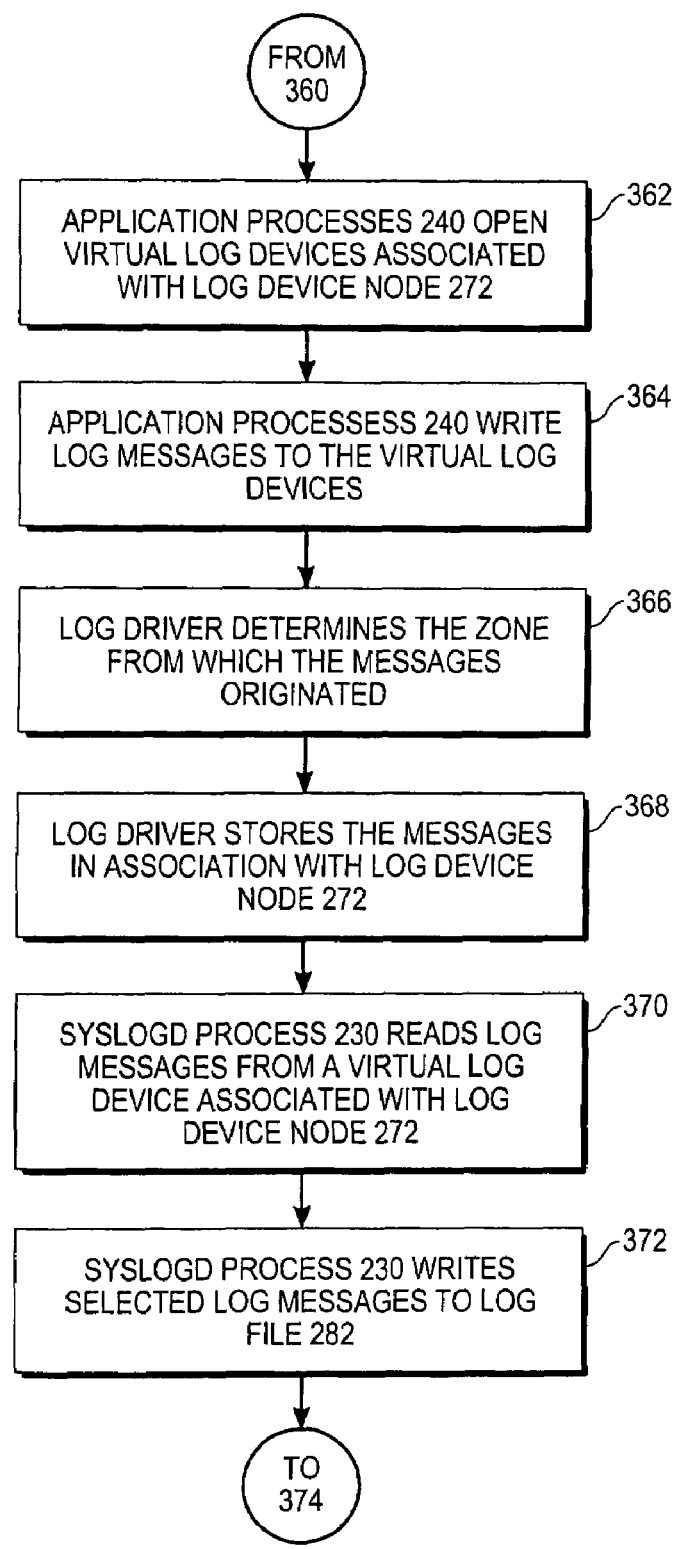
Figure 3F:
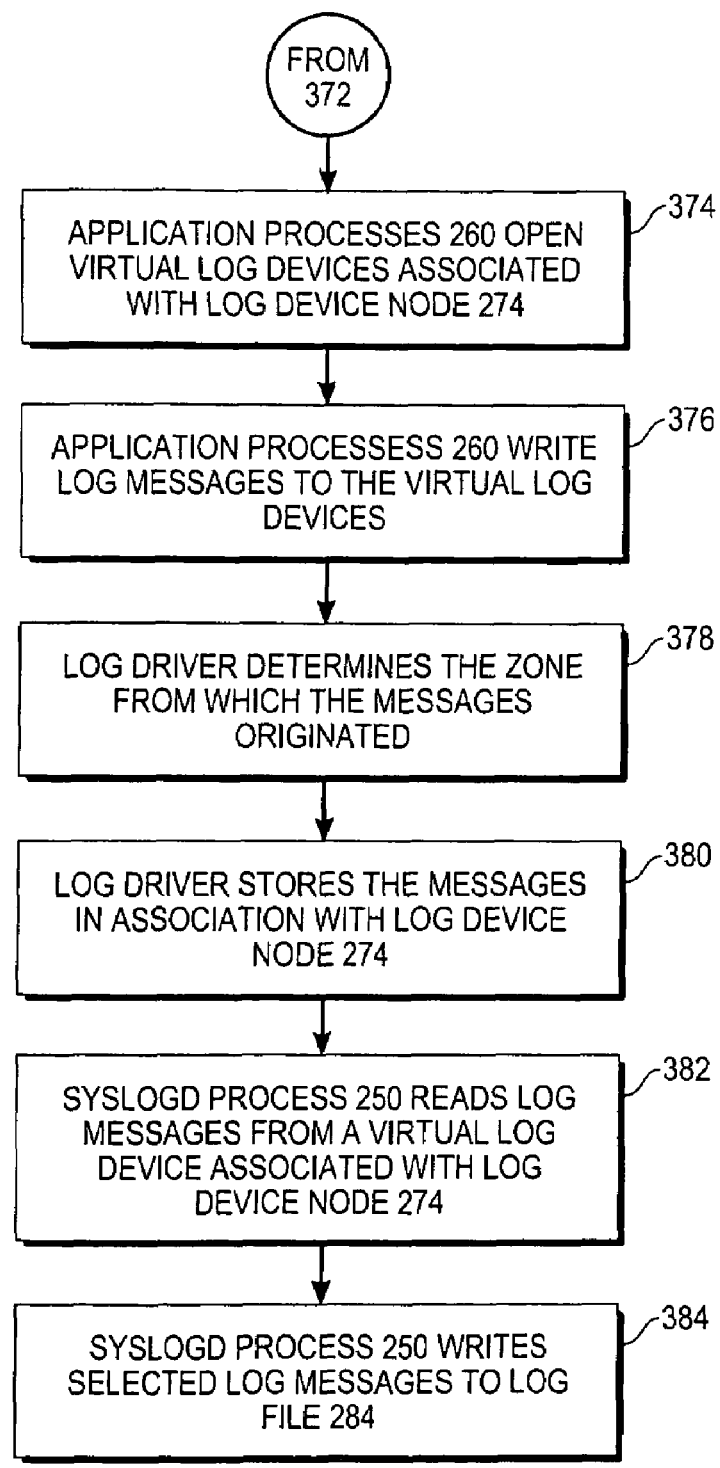

FIG. 2 illustrates a functional block diagram of a partitioned system logging mechanism in a partitioned OS environment in accordance with one embodiment of the present invention. Global zone 130 and non-global zones 140 from FIG. 1 are shown. A syslogd process 210 and application processes 220 execute in global zone 130. A syslogd process 230 and application processes 240 execute in non-global zone A 140a. A syslogd process 250 and application processes 260 execute in non-global zone B 140b. The processes that execute in a particular zone are associated with that zone. For example, each separate zone may have a separate zone identifier that may be associated with a process' process identifier. Associations between processes and zones may be established and maintained in memory.

Global zone 130 includes a log device node 270. Non-global zone A 140a includes a log device node 272. Non-global zone B 140b includes a log device node 274. Log device nodes 270, 272, and 274 are all different access points to a log driver that is implemented as a system device in kernel 150. Log device nodes 270, 272, and 274 are special files that provide access to that system device. Thus, each of log device nodes 270, 272, and 274 functions as the log driver.

Log device node 270 is located in a file system associated with global zone 130. Log device node 272 is located in file system 180a, which is associated with non-global zone A 140a. Log device node 274 is located in file system 180b, which is associated with non-global zone B 140b. According to one embodiment, each of log device nodes 270, 272, and 274 provides at least two different interfaces or "pseudo-devices"; one for writing messages to the log device node, and one for reading messages from the log device node. Each interface is implemented in a manner such that the interface may be written to or read from as though the interface was a file separate from the other interface.

For example, from the perspective of processes executing in global zone 130, the interfaces of log device node 270 might appear to be two files: "/dev/conslog" to which messages may be written, and "/dev/log" from which messages may be read; the interfaces of log device node 272 might appear to be two files: "/zonea/dev/conslog" and "/zonea/dev/log"; and the interfaces of log device node 274 might appear to be two files: "/zoneb/dev/conslog" and "/zoneb/dev/log". However, from the perspective of processes executing in non-global zone A 140a, the interfaces of log device node 272 would appear to be two files: "/dev/conslog" and "/dev/log"; and from the perspective of processes executing in non-global zone B 140b, the interfaces of log device node 274 would appear to be two files: "/dev/conslog" and "/dev/log".

This is at least partially because file systems 180 of non-global zones 140 may be based on different subtrees of the file hierarchy tree of global zone 130. Different subtrees of the file hierarchy tree visible in global zone 130 may be made to appear as the complete file hierarchy tree in different non-global zones 140. Therefore, the root directories of file systems 180 apparent in non-global zones 140 actually may be subdirectories of the root directory apparent in global zone 130. The root directory in non-global zone A 140a may be the same as "/zonea" in global zone 130, and the root directory in non-global zone B 140b may be the same as "/zoneb" in global zone 130.

Thus, to processes executing within a particular zone, the interfaces of the log device node for that particular zone may appear to be located at expected locations in a file system hierarchy. This allows programs to be designed in a way that does not require the designer to account for the multi-zoned aspect of the OS environment. A process may write messages to and read messages from "/dev/conslog" and "/dev/log", respectively, regardless of the zone in which that process executes.

Thus, syslogd process 230 and application processes 240 may read messages from and write messages to log device node 272, while syslogd process 250 and application processes 260 may read messages from and write messages to log device node 274. Processes executing in non-global zone A 140a are prevented from reading messages from or writing messages to log device nodes 270 and 274. Similarly, processes executing in non-global zone B 140b are prevented from reading messages from or writing messages to log device nodes 270 and 272. However, processes executing in global zone 130 may read messages from and write messages to any or all of log device nodes 270, 272, and 274. Additionally, processes of kernel 150 also may read messages from and write messages to any or all of log device nodes 270, 272, and 274.

In one embodiment, to write to a log device node, an application process calls a write( ) function provided by kernel 150, and to read from a log device node, an application process calls a read( ) function provided by kernel 150. Based on the zone identifiers associated with the process identifiers of the processes that call the functions, kernel 150 determines the zones from which such calls originate, and reads from/writes to the log device nodes associated with the zones in which the calling processes execute. A mechanism of kernel 150 "tags" each log message with the identity of the zone from which the log message was sent.

Syslogd process 230 reads messages from log device node 272. For each message, syslogd process 230 determines, based on configuration parameters and the type of the message, whether the message should be written to log file 282. If syslogd process 230 determines that a message should be written to log file 282, then syslogd process 230 writes the message to log file 282. Log file 282 is located in file system 180a. Subsequently, a zone administrator for non-global zone A 140a may view the contents of log file 282 in order to stay aware of events occurring relative to non-global zone A 140a.

In a similar manner, syslogd process 250 reads messages from log device node 274 and selectively writes some or all of those messages to log file 284. Log file 284 is located in file system 180b. Therefore, a zone administrator for non-global zone B 140b may view the contents of log file 284.

Syslogd process 230 is prevented from writing to log files 280 and 284 because log files 280 and 284 are not associated with non-global zone A 140a. Likewise, syslogd process 250 is prevented from writing to log files 280 and 282 because log files 280 and 282 are not associated with non-global zone B 140b. Additionally, the zone administrator for non-global zone A 140a cannot view log files that are not located in file system 180a of non-global zone A 140a, and the zone administrator for non-global zone B 140b cannot view log files that are not located in file system 180b of non-global zone B 140b.

However, because syslogd process 210 is associated with global zone 130, syslogd process 210 can read messages from any of log device nodes 270, 272, and 274, and can write messages to any or all of log files 280, 282, and 284.

In one embodiment, when syslogd process 210 or any of application processes 220 writes a message to a log device node, that process writes the message through an interface that accepts, as parameters, the identities of the zones containing the log device nodes to which the message is to be written. The message is consequently written to each of the log device nodes in the zones specified by the writing processes. In this manner, a process executing in global zone 130 may write a message to one or more of global zone 130 and non-global zones 140.

Log device nodes 270, 272, and 274 function as message streams or buffers into which messages can be written and from which messages can be read. In one embodiment, for each separate process that reads from or writes to a particular log device node, a "clone" of the particular log device node is instantiated to interface with that process. For example, if six different processes were reading messages from and/or writing messages to log device node 272, then six different clones of log device node 272 would be instantiated; one for each process. When a process ceases to exist, so does the clone log device node that was associated with that process. A clone of a log device node also may be called a virtual device.

Each clone of a particular log device node receives all of the messages that are written to the particular log device node. As a message is read from a clone log device node, the message is removed from the clone log device node so as not to be repeated to the process that corresponds to the clone log device node. Because different processes may read messages at different times, different clones of the same log device node may contain different messages at any given moment.

Sample Operation

With the above information in mind, a sample of operation of the system 100 in accordance with one embodiment of the present invention will now be described. In the following discussion, reference will be made to the system diagrams of FIGS. 1-2 and the flow diagrams of FIGS. 3A-F.

FIGS. 3A-F depict an operational flow for logging system messages in an operating system environment that has been partitioned into a global zone and one or more non-global zones, in accordance with one embodiment of the present invention. Global zone 130 is established (block 302). Global zone 130 is associated (block 304) with a unique zone identifier. Syslogd process 210 is executed (block 306) in global zone 130. Syslogd process 210 is associated (block 308) with the zone identifier of global zone 130. Syslogd process 210 opens (block 310) a virtual log device corresponding to log device node 270. The virtual log device is associated (block 312) with the zone identifier of global zone 130. Application processes 220 are executed (block 314) in global zone 130. Each of application processes 220 is associated (block 316) with the zone identifier of global zone 130.

Non-global zone A 140a is established (block 318) in global zone 130. Non-global zone A 140a is associated (block 320) with a unique zone identifier. Syslogd process 230 is executed in non-global zone A 140a (block 322). Syslogd process 230 is associated (block 324) with the zone identifier of non-global zone A 140a. Syslogd process 230 opens (block 326) a virtual log device corresponding to log device node 272. The virtual log device is associated (block 328) with the zone identifier of non-global zone A 140a. Application processes 240 are executed (block 330) in non-global zone A 140a. Each of application processes 240 is associated (block 332) with the zone identifier of non-global zone 140a.

Non-global zone B 140b is established (block 334) in global zone 130. Non-global zone B 140b is associated (block 336) with a unique zone identifier. Syslogd process 250 is executed (block 338) in global zone 130. Syslogd process 250 is associated (block 340) with the zone identifier of non-global zone B 140b. Syslogd process 250 opens (block 342) a virtual log device corresponding to log device node 274. The virtual log device is associated (block 344) with the zone identifier of non-global zone B 140b. Application processes 260 are executed (block 346) in non-global zone B 140a. Each of application processes 260 is associated (block 348) with the zone identifier of non-global zone 140b.

Application processes 220 open (block 350) virtual log devices associated with log device node 270. Application processes 220 write (block 352) log messages to these virtual log devices. A log driver of kernel 150 determines (block 354), from the zone identifier associated with application processes 220, the zone from which the messages originated. Determining that the messages originated from global zone 130, the log driver stores (block 356) the log messages in association with log device node 270. In one embodiment, the log driver additionally stores messages originating from global zone 130 in association with either or both of log device nodes 272 and 274.

Syslogd process 210 reads (block 358) log messages from a virtual log device associated with log device node 270. Syslogd process 210 writes (block 360) selected log messages to log file 280. In one embodiment, syslogd process 210 additionally writes selected log messages to either or both of log files 282 and 284.

Application processes 240 open (block 362) virtual log devices associated with log device node 272. Application processes 240 write (block 364) log messages to these virtual log devices. A log driver of kernel 150 determines (block 366), from the zone identifier associated with applications 240, the zone from which the messages originated. Determining that the messages originated from non-global zone A 140a, the log driver stores (block 368) the log messages only in association with log device node 272.

Syslogd process 230 reads (block 370) log messages from a virtual log device associated with log device node 272. Syslogd process 230 writes (block 372) selected log messages to log file 282.

Application processes 260 open (block 374) virtual log devices associated with log device node 274. Application processes 260 write (block 376) log messages to these virtual log devices. A log driver of kernel 150 determines (block 378), from the zone identifier associated with applications 260, the zone from which the messages originated. Determining that the messages originated from non-global zone B 140b, the log driver stores (block 380) the log messages only in association with log device node 274.

Syslogd process 250 reads (block 382) log messages from a virtual log device associated with log device node 274. Syslogd process 250 writes (block 384) selected log messages to log file 284.

Hardware Overview

In one embodiment, the various components of computing environment 100 shown in FIG. 1 can be implemented as sets of instructions executable by one or more processors. These components may be implemented as part of an operating system, including but not limited to the Solaris™ operating system produced by Sun Microsystems, Inc. FIG. 4 is a hardware block diagram of a sample computer system 400, upon which one or more components of an embodiment of the present invention may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line. Appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

Processor 404 may execute the received code as it is received. Additionally or alternatively, the code may be stored in storage device 410 or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
    establishing, in association with a global operating system environment (OSE) controlled by an operating system kernel instance, a first log device node;
    establishing, in association with a first virtual operating system environment (VOSE) of a plurality of VOSEs controlled by the operating system kernel instance, a second log device node;
    wherein one or more interfaces of the first log device node are associated with one or more first files located in a global file system tree;
    wherein one or more interfaces of the second log device node are associated with one or more second files located in a first subtree of the global file system tree; and
    wherein the one or more first files are not located in the first subtree;
    establishing a first log file at a location in the global file system tree, wherein the location is not within the first subtree;
    establishing a second log file at a location in the first subtree;
    executing, in association with the global OSE, a first process that reads data from the first log device node and writes at least some of the data from the first log device node into the first log file; and
    executing, in association with the first VOSE, a second process that does not read data from any log device node other than the second log device node and writes at least some of the data from the second log device node into the second log file;
    wherein, to the second process, a directory path of the second log file appears to be the same as a directory path of the first log file.

2. The method of claim 1, wherein, to processes executing in association with the first VOSE, a directory path of the one or more second files appears to be the same as a directory path of the one or more first files.

3. The method of claim 1, further comprising:
    establishing, in association with a second virtual operating system environment (VOSE) of the plurality of VOSEs, a third log device node;
    wherein one or more interfaces of the third log device node are associated with one or more third files located in a second subtree of the global file system tree; and
    wherein the second subtree differs from the first subtree.

4. The method of claim 3, wherein, to processes executing in association with the second VOSE, a directory path of the one or more third files appears to be the same as a directory path of the one or more second files.

5. The method of claim 1, wherein the first log device node and the second log device node are separate access points to a log driver that (a) is implemented as a system device in the operating system kernel instance and (b) reads log messages from a designated message stream and writes the log messages to a log file.

6. A machine-readable medium, comprising:
    instructions for causing one or more processors to establish, in association with a global operating system environment (OSE) controlled by an operating system kernel instance, a first log device node;
    instructions for causing one or more processors to establish, in association with a first virtual operating system environment (VOSE) of a plurality of VOSEs controlled by the operating system kernel instance, a second log device node;
    wherein one or more interfaces of the first log device node are associated with one or more first files located in a global file system tree;
    wherein one or more interfaces of the second log device node are associated with one or more second files located in a first subtree of the global file system tree; and
    wherein the one or more first files are not located in the first subtree;
    instructions for causing one or more processors to establish a first log file at a location in the global file system tree, wherein the location is not within the first subtree;
    instructions for causing one or more processors to establish a second log file at a location in the first subtree;
    instructions for causing one or more processors to execute, in association with the global OSE, a first process that reads data from the first log device node and writes at least some of the data from the first log device node into the first log file; and
    instructions for causing one or more processors to execute, in association with the first VOSE, a second process that does not read data from any log device node other than the second log device node and writes at least some of the data from the second log device node into the second log file;
    wherein, to the second process, a directory path of the second log file appears to be the same as a directory path of the first log file.

7. The machine-readable medium of claim 6, wherein, to processes executing in association with the first VOSE, a directory path of the one or more second files appears to be the same as a directory path of the one or more first files.

8. The machine-readable medium of claim 6, further comprising:
    instructions for causing one or more processors to establish, in association with a second virtual operating system environment (VOSE) of the plurality of VOSEs, a third log device node;
    wherein one or more interfaces of the third log device node are associated with one or more third files located in a second subtree of the global file system tree; and
    wherein the second subtree differs from the first subtree.

9. The machine-readable medium of claim 8, wherein, to processes executing in association with the second VOSE, a directory path of the one or more third files appears to be the same as a directory path of the one or more second files.

10. The machine-readable medium of claim 6, wherein the first log device node and the second log device node are separate access points to a log driver that (a) is implemented as a system device in the operating system kernel instance and (b) reads log messages from a designated message stream and writes the log messages to a log file.

11. A system, comprising:
    a processor;
    a memory coupled to the processor;
    a global operating system environment (OSE) controlled by an operating system kernel instance;
    a plurality of virtual operating system environments (VOSEs) controlled by the operating system kernel instance;

a first log device node that is associated with the global operating system environment;

a second log device node that is associated with a first VOSE of the plurality of VOSEs;

wherein one or more interfaces of the first log device node are associated with one or more first files located in a global file system tree;

wherein one or more interfaces of the second log device node are associated with one or more second files located in a first subtree of the global file system tree; and wherein the one or more first files are not located in the first subtree;

a first log file located at a location that is within the global file system tree, but not within the first subtree;

a second log file located at a location that is within the first subtree;

a first process that executes in association with the global OSE, wherein the first process reads data from the first log device node and writes at least some of the data from the first log device node into the first log file; and a second process that executes in association with the first VOSE, wherein the second process does not read data from any log device node other than the second log device node and writes at least some of the data from the second log device node into the second log file;

wherein, to the second process, a directory path of the second log file appears to be the same as a directory path of the first log file.

12. The system of claim 11, wherein, to processes executing in association with the first VOSE, a directory path of the one or more second files appears to be the same as a directory path of the one or more first files.

13. The system of claim 11, further comprising:

a third log device node that is associated with a second VOSE of the plurality of VOSEs;

wherein one or more interfaces of the third log device node are associated with one or more third files located in a second subtree of the global file system tree; and wherein the second subtree differs from the first subtree.

14. The system of claim 13, wherein, to processes executing in association with the second VOSE, a directory path of the one or more third files appears to be the same as a directory path of the one or more second files.

15. The system of claim 11, wherein the first log device node and the second log device node are separate access points to a log driver that (a) is implemented as a system device in the operating system kernel instance and (b) reads log messages from a designated message stream and writes the log messages to a log file.

* * * * *